US009218281B2

(12) United States Patent
Cohen et al.

(10) Patent No.: US 9,218,281 B2
(45) Date of Patent: Dec. 22, 2015

(54) MAINTAINING ORDERING VIA A MULTI-LEVEL MAP OF A SOLID-STATE MEDIA

(71) Applicant: Seagate Technology LLC, Cupertino, CA (US)

(72) Inventors: Earl T. Cohen, Oakland, CA (US); Leonid Baryudin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 287 days.

(21) Appl. No.: 14/022,781

(22) Filed: Sep. 10, 2013

(65) Prior Publication Data

US 2014/0047170 A1 Feb. 13, 2014

Related U.S. Application Data

(63) Continuation-in-part of application No. PCT/US2012/049905, filed on Aug. 8, 2012, and a continuation-in-part of application No. 13/963,074, filed on Aug. 9, 2013, now abandoned.

(60) Provisional application No. 61/783,555, filed on Mar. 14, 2013.

(51) Int. Cl.
G06F 12/02 (2006.01)
(52) U.S. Cl.
CPC ............................... G06F 12/0246 (2013.01)
(58) Field of Classification Search
None
See application file for complete search history.

(56) References Cited

U.S. PATENT DOCUMENTS

| 4,942,553 | A  | 7/1990  | Dalrymple et al. |
|-----------|----|---------|------------------|
| 7,975,193 | B2 | 7/2011  | Johnson          |
| 8,166,233 | B2 | 4/2012  | SchibillIa et al.|
| 8,166,258 | B2 | 4/2012  | Lund et al.      |
| 8,219,776 | B2 | 7/2012  | Forhan et al.    |
| 8,245,112 | B2 | 8/2012  | Hicken et al.    |
| 8,301,861 | B2 | 10/2012 | Reiter et al.    |
| 2008/0082736 | A1 | 4/2008 | Chow et al.     |

(Continued)

FOREIGN PATENT DOCUMENTS

WO 2012/148828 A2 11/2012

OTHER PUBLICATIONS

Kent Smith, "Understanding SSD Over-Provisioning", Jan. 8, 2013, available at: http://www.edn.com/design/systems-design/4404566/1/Understanding-SSD-over-provisioning (last checked Jan. 23, 2013), (USA).
Sun et al; "On the Use of Strong BCH Codes for Improving Multi-level NAND Flash Memory Storage Capacity"; ECSE Department, Renssaelaer Polytechnic Institute, Aug. 2006, USA.
Micron Technology, Inc. "NAND Flash 101: An Introduction to NAND Flash and How to Design it into your next product"; TN-29-19; 2006; pp. 1-28; Micron Technology, Inc. Boise Idaho, USA.

(Continued)

*Primary Examiner* — Kevin Verbrugge

(57) ABSTRACT

Described embodiments provide a media controller that processes requests including a logical address and address range. A map of the media controller determines physical addresses of a media associated with the logical address and address range of the request. The map is a multi-level map having a plurality of leaf-level map pages that are stored in the media, with a subset of the leaf-level map pages stored in a map cache. Based on the logical address and address range, it is determined whether a corresponding leaf-level map page is stored in the map cache. If the leaf-level map page is stored in the map cache, a cache index and control indicators of the map cache entry are returned in order to enforce ordering rules that selectively enable access to a corresponding leaf-level map page based on the control indicators and a determined request type.

31 Claims, 11 Drawing Sheets

(56) References Cited

U.S. PATENT DOCUMENTS

| | | |
|---|---|---|
| 2009/0094433 A1 | 4/2009 | Thomas et al. |
| 2009/0198946 A1 | 8/2009 | Ebata |
| 2010/0325351 A1 | 12/2010 | Bennett |
| 2011/0072199 A1 | 3/2011 | Reiter et al. |
| 2011/0083047 A1 | 4/2011 | Stenfort |
| 2011/0099320 A1 | 4/2011 | Lucas et al. |
| 2011/0145306 A1 | 6/2011 | Boyd et al. |

OTHER PUBLICATIONS

Kang et al., "A Superblock-based Flash Translation Layer for NAND Flash Memory"; Computer Science Division: Korea Advanced Institute of Science and Technology (KAIST); EMSOFT '06 Seoul, Korea; pp. 161-170, Published by ACM, NY, NY USA, 2006.

Birrell et al., "A Design for High-Performance Flash Disks", ACM SIGOPS Operating Systems Review, vol. 41, Issue 2, pp. 88-93, Apr. 2007.

800

1000

MAINTAINING ORDERING VIA A MULTI-LEVEL MAP OF A SOLID-STATE MEDIA

CROSS-REFERENCE TO RELATED APPLICATIONS

This application is a continuation-in-part, and claims the benefit of the filing date, of International Patent Application no. PCT/US2012/049905 filed Aug. 8, 2012, and U.S. patent application Ser. No. 13/963,074 filed Aug. 9, 2013, the teachings of which are incorporated herein in their entireties by reference.

This application claims the benefit of the filing date of U.S. provisional patent application No. 61/783,555 filed Mar. 14, 2013, the teachings of which are incorporated herein in their entireties by reference.

The subject matter of this application is related to U.S. patent application Ser. Nos. 13/464,433 filed May 4, 2012, 13/567,025 filed Aug. 4, 2012, 13/600,464 filed Aug. 31, 2012, 13/729,966 filed Dec. 28, 2012, and 13/748,260 filed Jan. 23, 2013, the teachings of which are incorporated herein in their entireties by reference.

BACKGROUND

Flash memory is a non-volatile memory (NVM) that is a specific type of electrically erasable programmable read-only memory (EEPROM). One commonly employed type of flash memory technology is NAND flash memory. NAND flash memory requires small chip area per cell and is typically divided into one or more banks or planes. Each bank is divided into blocks; each block is divided into pages. Each page includes a number of bytes for storing user data, error correction code (ECC) information, or both.

There are three basic operations for NAND devices: read, write and erase. The read and write operations are performed on a page-by-page basis. Page sizes are generally $2^N$ bytes of user data (plus additional bytes for ECC information), where N is an integer, with typical user data page sizes of, for example, 2,048 bytes (2 KB), 4,096 bytes (4 KB), 8,192 bytes (8 KB) or more per page. A "read unit" is the smallest amount of data and corresponding ECC information that can be read from the NVM and corrected by the ECC, and might typically be between 4K bits and 32K bits (e.g., there is generally an integer number of read units per page). Pages are typically arranged in blocks, and an erase operation is performed on a block-by-block basis. Typical block sizes are, for example, 64, 128 or more pages per block. Pages must be written sequentially, usually from a low address to a high address within a block. Lower addresses cannot be rewritten until the block is erased. Associated with each page is a spare area (typically 100-640 bytes) generally used for storage of ECC information and/or other metadata used for memory management. The ECC information is generally employed to detect and correct errors in the user data stored in the page, and the metadata might be used for mapping logical addresses to and from physical addresses. In NAND flash chips with multiple banks, multi-bank operations might be supported that allow pages from each bank to be accessed substantially in parallel.

NAND flash memory stores information in an array of memory cells made from floating gate transistors. These transistors hold their voltage level, also referred to as charge, for long periods of time, on the order of months or years, without external power being supplied. In single-level cell (SLC) flash memory, each cell stores one bit of information. In multi-level cell (MLC) flash memory, each cell can store more than one bit per cell by choosing between multiple levels of electrical charge to apply to the floating gates of its cells. MLC NAND flash memory employs multiple voltage levels per cell with a serially linked transistor arrangement to allow more bits to be stored using the same number of transistors. Thus, considered individually, each cell has a particular programmed charge corresponding to the logical bit value(s) stored in the cell (e.g., 0 or 1 for SLC flash; 00, 01, 10, 11 for MLC flash), and the cells are read based on one or more threshold voltages for each cell. However, increasing the number of bits per cell increases cell-to-cell interference and retention noise, increasing the likelihood of read errors and, thus, the bit error ratio (BER) of the system. Further, the read threshold voltages of each cell change over operating time of the NVM, for example due to read disturb, write disturb, retention loss, cell aging and process, voltage and temperature (PVT) variations, also increasing BER.

As described, typical NVMs require that a block be erased before new data can be written to the block. Thus, NVM systems, such as solid-state disks (SSDs) employing one or more NVM chips, typically periodically initiate a "garbage collection" process to erase data that is "stale" or out-of-date to prevent the flash memory from filling up with data that is mostly out-of-date, which would reduce the realized flash memory capacity. However, NVM blocks can be erased only a limited number of times before device failure. For example, a SLC flash might only be able to be erased on the order of 100,000 times, and a MLC flash might only be able to be erased on the order of 10,000 times. Therefore, over the operational life (e.g., over a rated number of program/erase (P/E) cycles for NAND flash) of an NVM, the NVM wears and blocks of flash memory will fail and become unusable. Block failure in NVMs is analogous to sector failures in hard disk drives (HDDs). Typical NVM systems might also perform wear-leveling to distribute, as evenly as possible, P/E cycles over all blocks of the NVM. Thus, over the lifetime of an NVM system, the overall storage capacity might be reduced as the number of bad blocks increases and/or the amount of storage used for system data requirements (e.g., logical-to-physical translation tables, logs, metadata, ECC, etc.) increases. Thus, it can be important to reduce the amount of data written to the NVM during the garbage collection process.

During the garbage collection process, user data in a block which is still valid is moved to new location on the storage media in a background process. "Valid" user data might be any address that has been written at least once, even if the host device is no longer using this data. To reduce the amount of "valid" but no longer needed data that is rewritten during garbage collection, some storage protocols support commands that enable an NVM to designate blocks of previously saved data as unneeded or invalid such that the blocks are not moved during garbage collection, and the blocks can be made available to store new data. Examples of such commands are the SATA TRIM (Data Set Management) command, the SCSI UNMAP command, the MultiMediaCard (MMC) ERASE command, and the Secure Digital (SD) card ERASE command. Generally, such commands improve NVM performance such that a fully trimmed NVM has performance approaching that of a newly manufactured (i.e., empty) NVM of the same type. However, performing these commands for large numbers of blocks at once can be time consuming and reduce operating efficiency of the NVM.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a media controller that processes requests from a host device that include a logical address and address range. A map of the media controller determines physical addresses of a solid-state media associated with the logical address and address range of the request. The map is a multi-level map having a plurality of leaf-level map pages that are stored in the solid-state media, with a subset of the leaf-level map pages stored in a map cache. Each leaf-level map page includes map entries that are each associated with physical addresses of the solid-state media. Based on the logical address and address range, it is determined whether a corresponding leaf-level map page is stored in the map cache. If the leaf-level map page is stored in the map cache, a cache index and control indicators of the map cache entry are returned in order to enforce ordering rules that selectively enable access to a corresponding leaf-level map page based on the control indicators and a determined request type.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments provide a media controller that processes requests from a host device that include a logical address and address range. A map of the media controller determines physical addresses of a solid-state media associated with the logical address and address range of the request. The map is a multi-level map having a plurality of leaf-level map pages that are stored in the solid-state media, with a subset of the leaf-level map pages stored in a map cache. Each leaf-level map page includes map entries that are each associated with physical addresses of the solid-state media. Based on the logical address and address range, it is determined whether a corresponding leaf-level map page is stored in the map cache. If the leaf-level map page is stored in the map cache, a cache index and control indicators of the map cache entry are returned in order to enforce ordering rules that selectively enable access to a corresponding leaf-level map page based on the control indicators and a determined request type.

Table 1 defines a list of acronyms employed throughout this specification as an aid to understanding the described embodiments:

TABLE 1

| BER | Bit Error Rate | BUS | Block Used Space |
| --- | --- | --- | --- |
| CAM | Content Addressable Memory | ECC | Error Correction Code |
| eDRAM | Embedded Dynamic Random Access Memory | EEPROM | Electrically Erasable Programmable Read-Only Memory |
| FLM | First Level Map | HDD | Hard Disk Drive |
| IC | Integrated Circuit | I/O | Input/Output |
| LBA | Logical Block Address | LDPC | Low-Density Parity-Check |
| LLR | Log-Likelihood Ratio | LPN | Logical Page Number |
| LSB | Least Significant Bit | LRU | Least Recently Used |
| MLC | Multi-Level Cell | MLM | Multi-Level Map |
| MMC | MultiMediaCard | MSB | Most Significant Bit |
| NVM | Non-Volatile Memory | OOS | Out-Of-Space |
| OP | Over Provisioning | PCI-E | Peripheral Component Interconnect Express |
| P/E | Program/Erase | PVT | Process, Voltage, Temperature |
| SAS | Serial Attached SCSI | SATA | Serial Advanced Technology Attachment |
| SCSI | Small Computer System Interface | SD | Secure Digital |
| SLC | Single Level Cell | SLM | Second Level Map |
| SoC | System on Chip | SRAM | Static Random Access Memory |
| SRIO | Serial Rapid Input/Output | SSD | Solid-State Disk |
| TBP | To-Be-Processed | USB | Universal Serial Bus |

Figure 1:
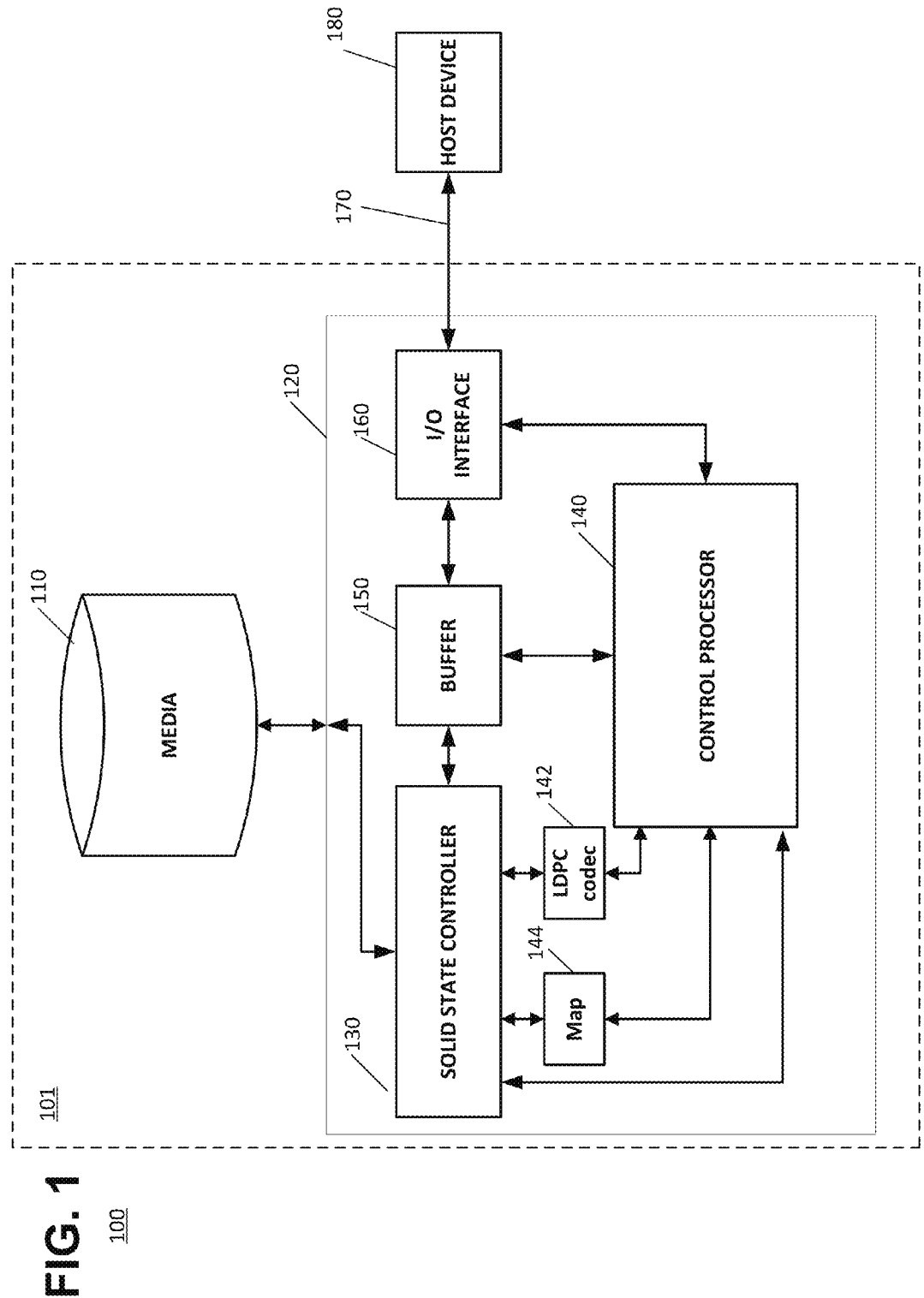
FIG. 1 shows a block diagram of a flash memory storage system in accordance with exemplary embodiments.

FIG. 1 shows a block diagram of non-volatile memory (NVM) storage system 100. NVM storage system 100 includes media 110, which is coupled to media controller 120. Media 110 might be implemented as a NAND flash solid-state disk (SSD), a magnetic storage media such as a hard disk drive (HDD), or as a hybrid solid-state and magnetic system. Although not shown in FIG. 1, media 110 might typically include one or more physical memories (e.g., non-volatile memories, NVMs), such as multiple flash chips. As shown in FIG. 1, media 110 and media controller 120 are collectively SSD 101. Media controller 120 includes solid-state controller 130, control processor 140, buffer 150 and I/O interface 160. Media controller 120 controls transfer of data between media 110 and host device 180 that is coupled to communication link 170. Media controller 120 might be implemented as a system-on-chip (SoC) or other integrated circuit (IC). Solid-state controller 130 might be used to access memory locations in media 110, and might typically implement low-level, device specific operations to interface with media 110. Buffer 150 might be a RAM buffer employed to act as a cache for control processor 140 and/or as a read/write buffer for operations between solid-state media 110 and host device 180. For example, data might generally be temporarily stored in buffer 150 during transfer between solid-state media 110 and host device 180 via I/O interface 160 and link 170. Buffer 150 might be employed to group or split data to account for differences between a data transfer size of communication link 170 and a storage unit size (e.g., read unit size, page size, sector size, or mapped unit size) of media 110. Buffer 150 might be implemented as a static random-access memory (SRAM) or as an embedded dynamic random-access memory (eDRAM) internal to media controller 120, although buffer 150 could also include memory external to media controller 120 (not shown), which might typically be implemented as a double-data-rate (e.g., DDR-3) DRAM.

Control processor 140 communicates with solid-state controller 130 to control data access (e.g., read or write operations) data in media 110. Control processor 140 might be implemented as one or more Pentium®, Power PC®, Tensilica® or ARM processors, or a combination of different processor types (Pentium® is a registered trademark of Intel Corporation, Tensilica® is a trademark of Tensilica, Inc., ARM processors are by ARM Holdings, plc, and Power PC® is a registered trademark of IBM). Although shown in FIG. 1 as a single processor, control processor 140 might be implemented by multiple processors (not shown) and include software/firmware as needed for operation, including to perform threshold optimized operations in accordance with described embodiments. Control processor 140 is in communication with low-density parity-check (LDPC) coder/decoder (codec) 142, which performs LDPC encoding for data written to media 110 and decoding for data read from media 110. Control processor 140 is also in communication with map 144, which is used to translate between logical addresses of host operations (e.g., logical block addresses (LBAs) for read/write operations, etc.) and physical addresses on media 110. As employed herein, the term LBA is synonymous with HPA (Host Page Address).

Communication link 170 is used to communicate with host device 180, which might be a computer system that interfaces with NVM system 100. Communication link 170 might be a custom communication link, or might be a bus that operates in accordance with a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other similar interface link for connecting a peripheral device to a computer.

Figure 2:
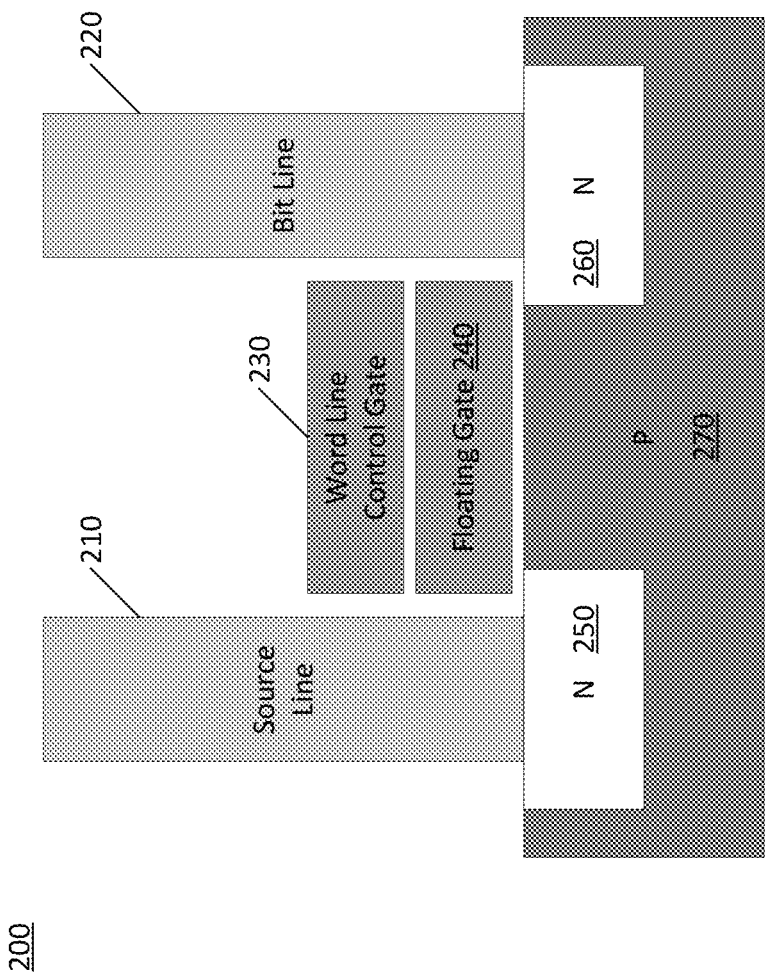
FIG. 2 shows an exemplary functional block diagram of a single standard flash memory cell.

FIG. 2 shows an exemplary functional block diagram of a single flash memory cell that might be found in solid-state media 110. Flash memory cell 200 is a MOSFET with two gates. The word line control gate 230 is located on top of floating gate 240. Floating gate 240 is isolated by an insulating layer from word line control gate 230 and the MOSFET channel, which includes N-channels 250 and 260, and P-channel 270. Because floating gate 240 is electrically isolated, any charge placed on floating gate 240 will remain and will not discharge significantly, typically for many months. When floating gate 240 holds a charge, it partially cancels the electrical field from word line control gate 230 that modifies the threshold voltage of the cell. The threshold voltage is the amount of voltage applied to control gate 230 to allow the channel to conduct. The channel's conductivity determines the value stored in the cell, for example by sensing the charge on floating gate 240.

Figure 3:
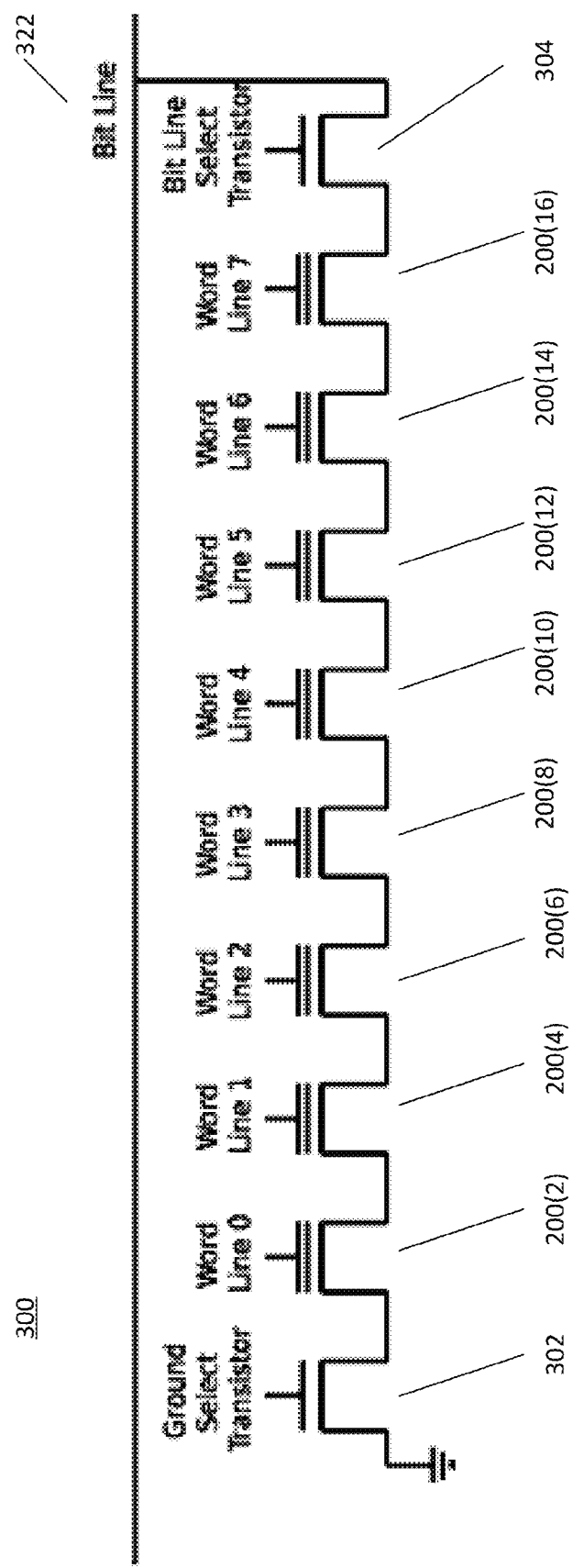
FIG. 3 shows an exemplary NAND MLC flash memory cell in accordance with exemplary embodiments.

FIG. 3 shows an exemplary NAND MLC flash memory string 300 that might be found in solid-state media 110. As shown in FIG. 3, flash memory string 300 might include one or more word line transistors 200(2), 200(4), 200(6), 200(8), 200(10), 200(12), 200(14), and 200(16) (e.g., 8 flash memory cells), and bit line select transistor 304 connected in series, drain to source. This series connection is such that ground select transistor 302, word line transistors 200(2), 200(4), 200(6), 200(8), 200(10), 200(12), 200(14) and 200(16), and bit line select transistor 304 are all "turned on" (e.g., in either a linear mode or a saturation mode) by driving the corresponding gate high in order for bit line 322 to be pulled fully low. Varying the number of word line transistors 200(2), 200(4), 200(6), 200(8), 200(10), 200(12), 200(14), and 200 (16), that are turned on (or where the transistors are operating in the linear or saturation regions) might enable MLC string 300 to achieve multiple voltage levels. A typical MLC NAND flash might employ a "NAND string" (e.g., as shown in FIG. 3) of 64 transistors with floating gates. During a write operation, a high voltage is applied to the NAND string in the word-line position to be written. During a read operation, a voltage is applied to the gates of all transistors in the NAND string except a transistor corresponding to a desired read location. The desired read location has a floating gate.

As described herein, in both SLC and MLC NAND flash, each cell has a voltage charge level (e.g., an analog signal) that can be sensed, such as by comparison with a read threshold voltage level. A media controller might have a given number of predetermined voltage thresholds employed to read the voltage charge level and detect a corresponding binary value of the cell. For example, for MLC NAND flash, if there are 3 thresholds (0.1, 0.2, 0.3), when a cell voltage level is 0.0≤cell voltage<0.1, the cell might be detected as having a value of [00]. If the cell voltage level is 0.1≤cell voltage<0.2, the value might be [10], and so on. Thus, a measured cell level might typically be compared to the thresholds one by one, until the cell level is determined to be in between two thresholds and can be detected. Thus, detected data values are provided to a decoder of memory controller 120 to decode the detected values (e.g., with an error-correction code) into data to be provided to host device 180.

Figure 4:
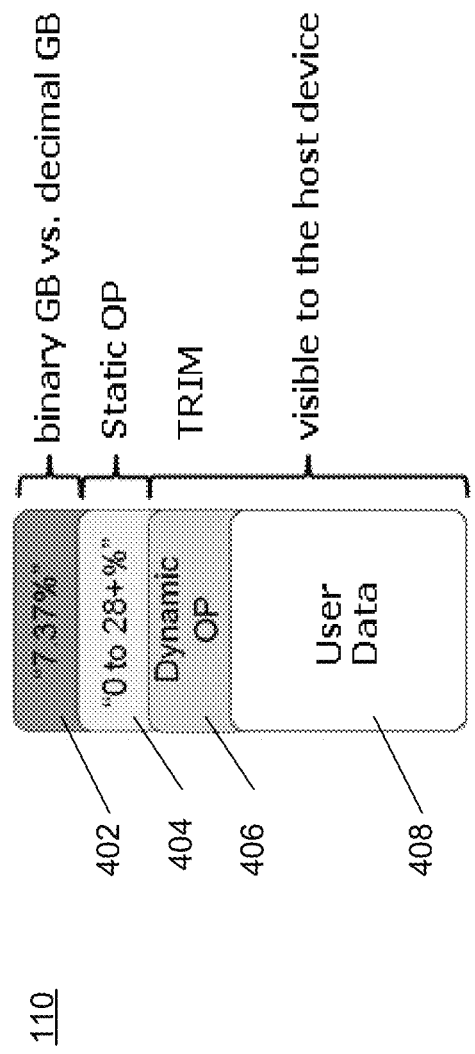
FIG. 4 shows a block diagram of an exemplary arrangement of the solid state media of the flash memory storage system of FIG. 1.

FIG. 4 shows a block diagram of an exemplary arrangement of solid-state media 110 of FIG. 1. As shown in FIG. 4, media 110 might be implemented with over-provisioning (OP) to prevent Out-of-Space (OOS) conditions from occurring. As shown in FIG. 4, OP might be achieved in three ways. First, SSD manufacturers typically employ the term "GB" to represent a decimal Gigabyte but a decimal Gigabyte (1,000,000,000 or $10^9$ bytes) and a binary Gibibyte (1,073,741,824 or $2^{30}$ bytes) are not equal. Thus, since the physical capacity of the SSD is based on binary GB, if the logical capacity of the SSD is based on decimal GB, the SSD might have a built-in OP of 7.37% (e.g., $[(2^{30}-10^9)/10^9]$). This is shown in FIG. 4 as "7.37%" OP 402. However, some of the OP, for example, 2-4% of the total capacity might be lost due to bad blocks (e.g., defects) of the NAND flash. Secondly, OP might be implemented by setting aside a specific amount of physical memory for system use that is not available to host device 180. For example, a manufacturer might publish a specification for their SSD having a logical capacity of 100 GB, 120 GB or 128 GB, based on a total physical capacity of 128 GB, thus possibly achieving exemplary OPs of 28%, 7% or 0%, respectively. This is shown in FIG. 4 as static OP ("0 to 28+%") 404.

Third, some storage protocols (e.g., SATA) support a "TRIM" command that enables host device 180 to designate blocks of previously saved data as unneeded or invalid such that NVM system 100 will not save those blocks during garbage collection. Prior to the TRIM command, if host device 180 erased a file, the file was removed from the host device records, but the actual contents of NVM system 100 were not actually erased, which cased NVM system 100 to maintain invalid data during garbage collection, thus reducing the NVM capacity. The OP due to efficient garbage collection by employing the TRIM command is shown in FIG. 4 as dynamic OP 406. Dynamic OP 406 and user data 408 form the area of media 110 that contains active data of host device 180, while OP areas 402 and 404 do not contain active data of host device 180. The TRIM command enables an operating system to notify an SSD of which pages of data are now invalid due to erases by a user or the operating system itself. During a delete operation, the OS marks deleted sectors as free for new data and sends a TRIM command specifying one or more ranges of Logical Block Addresses (LBAs) of the SSD associated with the deleted sectors to be marked as no longer valid.

After performing a TRIM command, the media controller does not relocate data from trimmed LBAs during garbage collection, reducing the number of write operations to the media, thus reducing write amplification and increasing drive life. The TRIM command generally irreversibly deletes the data it affects. Examples of a TRIM command are the SATA TRIM (Data Set Management) command, the SCSI UNMAP command, the MultiMediaCard (MMC) ERASE command, and the Secure Digital (SD) card ERASE command. Generally, TRIM improves SSD performance such that a fully trimmed SSD has performance approaching that of a newly manufactured (i.e., empty) SSD of a same type.

In general, media controller 120 executes commands received from host device 180. At least some of the commands write data to media 110 with data sent from host device 180, or read data from media 110 and send the read data to host device 180. Media controller 120 employs one or more data structures to map logical memory addresses (e.g., LBAs included in host operations) to physical addresses of the media. When an LBA is written in an SSD, the LBA is generally written to a different physical location each time, and each write updates the map to record where data of the LBA resides in the non-volatile memory (e.g., media 110). For example, in a system such as described in International Patent Application no. PCT/US2012/049905 filed Aug. 8, 2012, media controller 120 employs a multi-level map structure (e.g., map 144) that includes a leaf level and one or more higher levels. The leaf level includes map pages that each has one or more entries. A logical address, such as an LBA of an attached media (e.g., media 110), is looked up in the multi-level map structure to determine a corresponding one of the entries in a particular one of the leaf-level pages. The corresponding entry of the LBA contains information associated with the LBA, such as a physical address of media 110 associated with the LBA. In some implementations, the corresponding entry further comprises an indication as to whether the corresponding entry is valid or invalid, and optionally whether the LBA has had the TRIM command run on it ("trimmed") or has not been written at all. For example, an invalid entry is able to encode information, such as whether the associated LBA has been trimmed, in the physical location portion of the invalid entry.

To speed the look-up of LBAs, a cache (not shown) of at least some of the leaf-level pages might be maintained. In some embodiments, at least a portion of the map data structures are used for private storage that is not visible to host device 180 (e.g., to store logs, statistics, mapping data, or other private/control data of media controller 120).

As described herein, map 144 converts between logical data addressing used by host device 180 and physical data addressing used by media 110. For example, map 144 converts between LBAs used by host device 180 and block and/or page addresses of one or more flash dies of media 110. For example, map 144 might include one or more tables to perform or look up translations between logical addresses and physical addresses.

Figure 5:
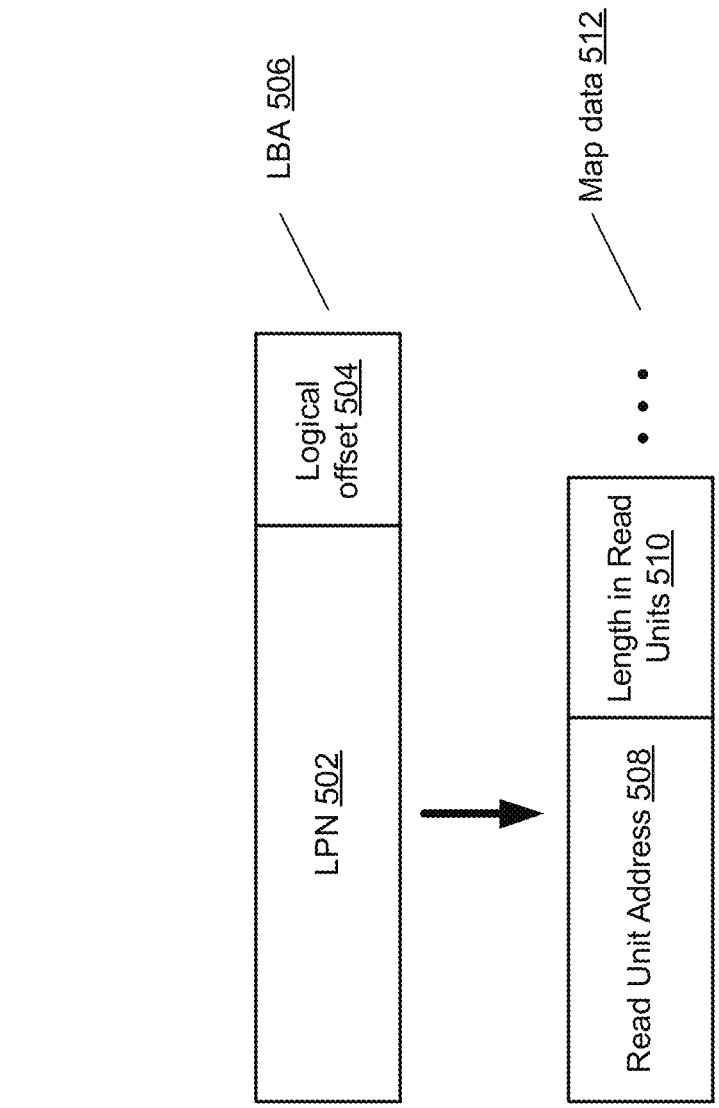
FIG. 5 shows a block diagram of an exemplary mapping of a logical page number (LPN) portion of a logical block number (LBA) of the flash memory storage system of FIG. 1.

Data associated with each LBA is stored at a corresponding physical address of media 110, either in a fixed, non-compressed size, or in a respective, compressed size. As described herein, a read unit is a finest granularity of media 110 that is independently readable, such as a portion of a page of media 110. The read unit might include (or correspond to) check bits and/or redundancy data of an error-correcting code (ECC) along with all data protected by the ECC. FIG. 5 illustrates selected details of an embodiment of mapping an LPN portion of an LBA by map 144. As shown in FIG. 5, LBA 506 includes Logical Page Number (LPN) 502 and logical offset 504. Map 144 translates LPN 502 into map data 512, which includes read unit address 508 and length in read units 510 (and perhaps other map data, as indicated by the ellipsis). Map data 512 might typically be stored as a map entry into a map table of map 144. Map 144 might typically maintain one map entry for each LPN actively in use by system 100. As shown, map data 512 includes read unit address 508 and length in read units 510. In some embodiments, a length and/or a span are stored encoded, such as by storing the length of the data associated with the LPN as an offset from the span in all (or a portion) of length in read units 510. The span (or length in read units) specifies a number of read units to read to retrieve the data associated with the LPN, whereas the length (of the data associated with the LPN) is used for statistics, such as Block Used Space (BUS) to track an amount of used space in each block of the SSD. Typically, the length has a finer granularity than the span.

In some embodiments, a first LPN is associated with a first map entry, a second LPN (different from the first LPN, but referring to a logical page of a same size as the logical page referred to by the first LPN) is associated with a second map entry, and the respective length in read units of the first map entry is different from the respective length in read units of the second map entry. In such embodiments, at a same point in time, the first LPN is associated with the first map entry, the second LPN is associated with the second map entry, and the respective read unit address of the first map entry is the same as the respective read unit address of the second map entry such that data associated with the first LPN and data associated with the second LPN are both stored in the same physical read unit of media 110.

Figure 6:
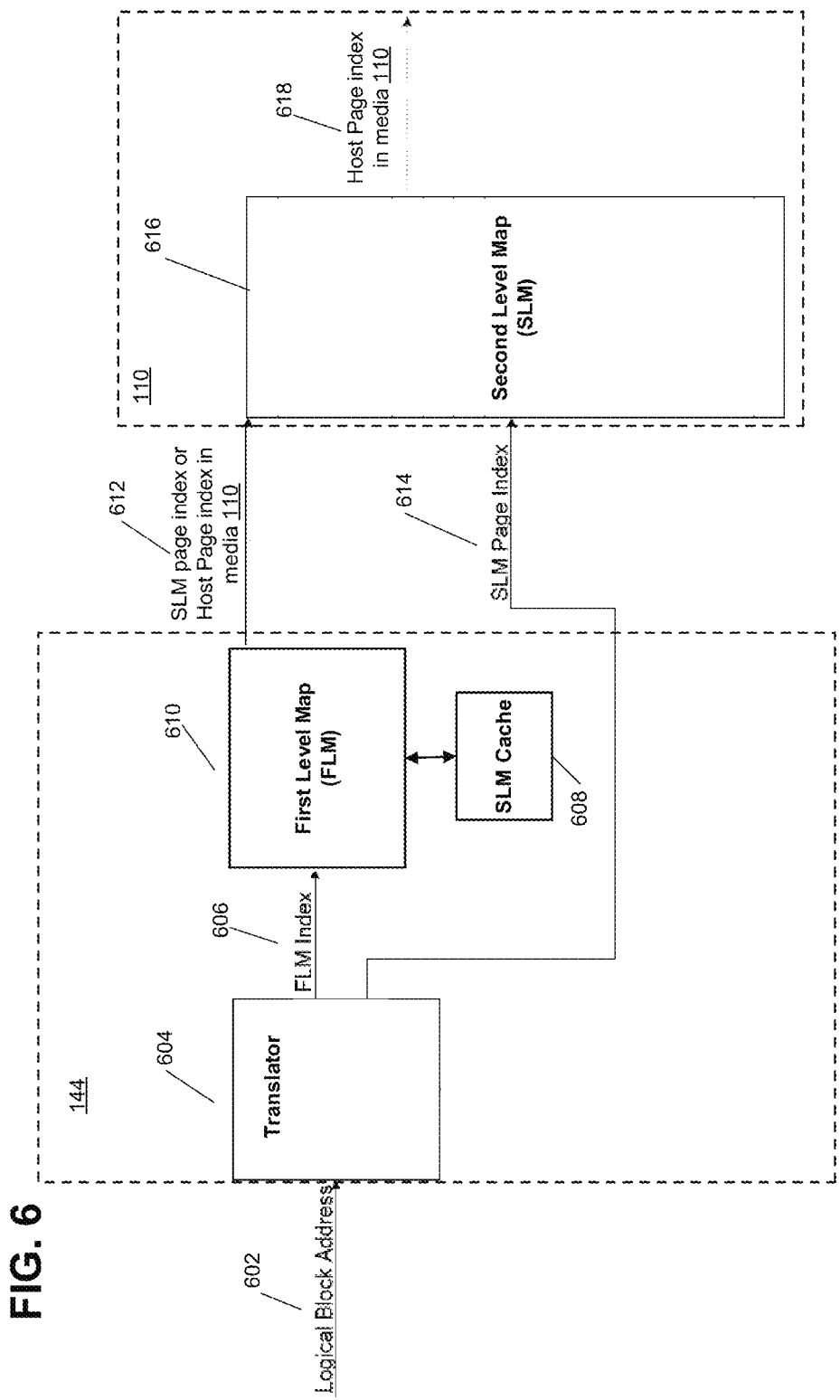
FIG. 6 shows a block diagram of an exemplary two-level mapping structure of the flash memory storage system of FIG. 1.

In various embodiments, map 144 is one of: a one-level map; a two-level map including a first level map (FLM) and one or more second level (or lower level) maps (SLMs) to associate the LBAs of the host protocol with the physical storage addresses in media 110. For example, as shown in FIG. 6, FLM 610 is maintained on-chip in media controller 120, for example in map 144. In some embodiments, a non-volatile (though slightly older) copy of FLM 610 is also stored on media 110. Each entry in FLM 610 is effectively a pointer to a SLM page (e.g., one of SLMs 616). SLMs 616 are stored in media 110 and, in some embodiments, some of the SLMs are cached in an on-chip SLM cache of map 144 (e.g., SLM cache 608). An entry in FLM 610 contains an address (and perhaps data length/range of addresses or other information) of the corresponding second-level map page (e.g., in SLM cache 608 or media 110). As shown in FIG. 6, map module 144 might include a two-level map with a first-level map (FLM) 610 that associates a first function (e.g., a quotient obtained when dividing the LBA by the fixed number of entries included in each of the second-level map pages) of a given LBA (e.g., LBA 602) with a respective address in one of a plurality of second-level maps (SLMs) shown as SLM 616, and each SLM associates a second function (e.g., a remainder obtained when dividing the LBA by the fixed number of entries included in each of the second-level map pages) of the LBA with a respective address in media 110 corresponding to the LBA.

For example, as shown in FIG. 6, translator 604 receives an LBA (LBA 602) corresponding to a host operation (e.g., a request from host 180 to read or write to the corresponding LBA on media 110). Translator 604 translates LBA 602 into FLM index 606 and SLM Page index 614, for example, by dividing LBA 602 by the integer number of entries in each of the corresponding SLM pages 616. In described embodiments, FLM index 606 is the quotient of the division operation, and SLM Page index 614 is the remainder of the division operation. Employing the dividing operation allows for SLM pages 616 to include a number of entries that is not a power of two, which might allow SLM pages 616 to be reduced in size, lowering write amplification of media 110 due to write operations to update SLM pages 616. FLM index 606 is used to uniquely identify an entry in FLM 610, the entry including an SLM page index (614) corresponding to one of SLM pages 616. As indicated by 612, in instances where the SLM page corresponding to the SLM page index of the FLM entry is stored in SLM cache 608, FLM 610 might return the physical address of media 110 corresponding to LBA 602. SLM page index 614 is used to uniquely identify an entry in SLM 616, the entry corresponding to a physical address of media 110 corresponding to LBA 602, as indicated by 618. Entries of SLM 616 might be encoded as a read unit address (e.g., the address of an ECC-correctable sub-unit of a flash page) and a length of the read unit.

SLM pages 616 (or a lower-level of a multi-level map (MLM) structure) might all include the same number of entries, or each of SLM pages 616 (or a lower-level of a MLM structure) might include a different number of entries. Further, the entries of SLM pages 616 (or a lower-level of a MLM structure) might be the same granularity, or the granularity might be set for each of SLM pages 616 (or a lower-level of a MLM structure). In exemplary embodiments, FLM 610 has a granularity of 4 KB per entry, and each of SLM pages 616 (or a lower-level of a MLM structure) has a granularity of 8 KB per entry. Thus, for example, each entry in FLM 610 is associated with an aligned eight-sector (4 KB) region of 512B LBAs and each entry in one of SLM pages 616 is associated with an aligned sixteen-sector (8 KB) region of 512B LBAs.

Figure 7:
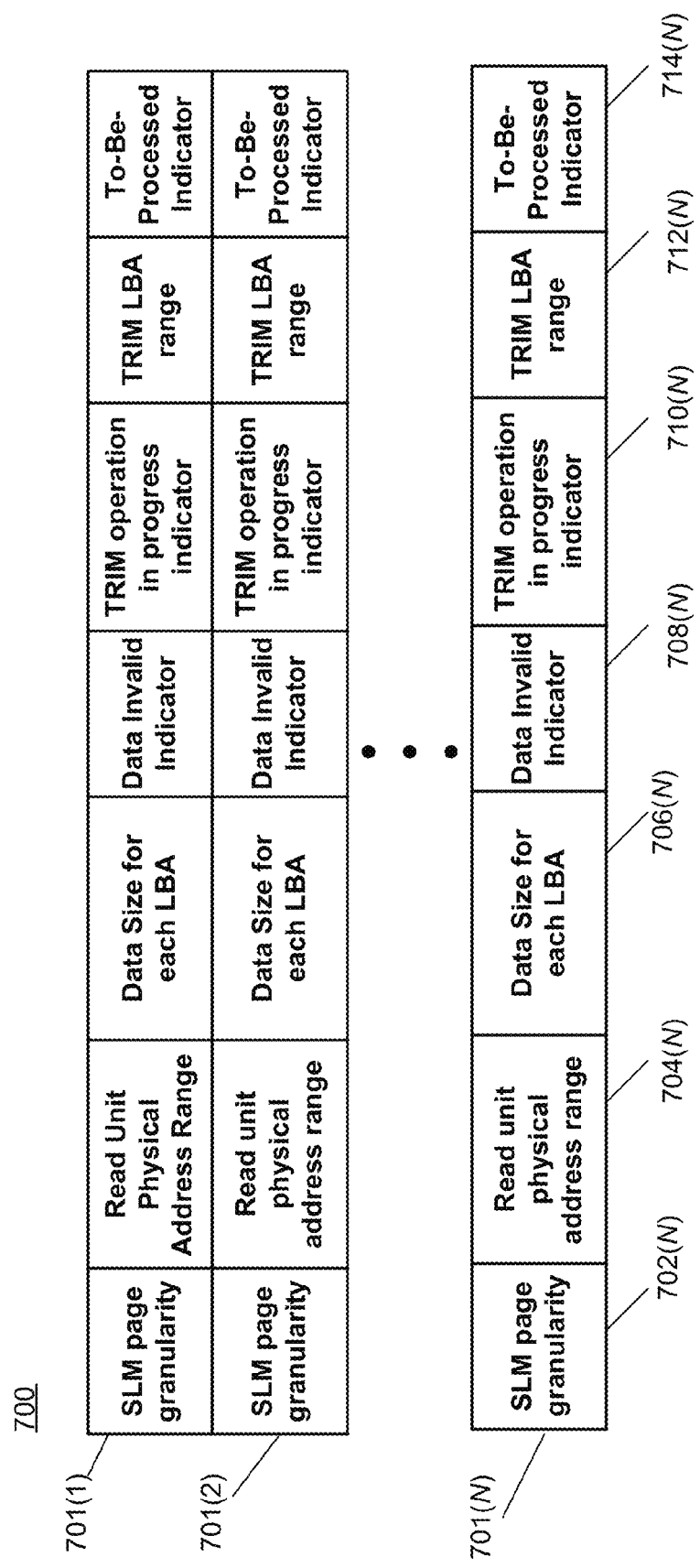
FIG. 7 shows a block diagram of exemplary map page headers employed by the flash memory storage system of FIG. 1.

In some embodiments, entries of FLM 610 (or a higher-level map of an MLM structure) include the format information of corresponding lower-level map pages. FIG. 7 shows a block diagram of exemplary FLM 700. As shown, each of the N entries 701 of FLM 700 includes format information of a corresponding lower-level map page. As shown, FLM 700 might include SLM page granularity 702, read unit physical address range 704, data size for each LBA 706, data invalid indicator 708, TRIM operation in progress indicator 710, TRIM LBA range 712 and To-Be-Processed (TBP) indicator 714. Other metadata (not shown) might also be included. Map page granularity 702 indicates the granularity of the SLM page corresponding to the entry of FLM 700. Read unit physical address range 704 indicates the physical address range of the read unit(s) of the SLM page corresponding to the entry of FLM 700, for example as a starting read unit address and span. Data size for each LBA 706 indicates a number of read units to read to obtain data of associated LBAs or a size of data of the associated LBAs stored in media 110 for the SLM page corresponding to the entry of FLM 700. Data invalid indicator 708 indicates that the data of the associated LBAs is not present in media 110, such as due to the data of the associated LBAs already being trimmed or otherwise invalidated. In alternative embodiments, data invalid indicator might be encoded as part of read unit physical address range 704. As will be described in greater detail below, TRIM operation in progress indicator 710 indicates that a TRIM operation is in progress on the LBAs indicated by TRIM LBA range 712. In some embodiments, TRIM operation in progress indicator 710 might be encoded as part of TRIM LBA range 712. TBP indicator 714 indicates when LBAs associated with the map page are already invalidated (e.g., appear trimmed to host 180), but the LBAs are not yet available to be written with new data. In contrast with marking a higher-level map entry invalid, setting the TBP bit of the higher-level map entry does not imply that a physical address of the lower-level map page stored in the higher-level map entry is invalid—the physical address is required, and the lower-level map page itself cannot be de-allocated, until the lower-level map page is processed for BUS updates. Lower-level map pages thus might be in one of three states: invalid, valid, or TBP.

An SSD employing a multi-level map (MLM) structure such as described herein enables an improved TRIM operation that spans over multiple leaf-level map units. Thus, instead of invalidating individual LBA entries as for a standard TRIM operation, the improved TRIM operation can invalidate entire leaf units in a higher map level of the MLM structure. This reduces latency of the TRIM operation from perspective of a host device coupled to media controller 120, advantageously allowing higher system performance. However, simply discarding individual trimmed LBA entries in the leaf-level maps could incur inaccuracy in Block Used Space (BUS) accounting, since trimmed LBAs still appear as contributing to BUS. The BUS count is maintained by media controller 120 in media 110 for each region of the non-volatile memory of the SSD, such as per flash block or group of flash blocks, as one way to determine when to perform garbage collection on a given block or group of blocks (e.g., the one with the least BUS) thus reducing garbage collection write amplification. Thus, an inaccuracy in BUS could result in inaccurate garbage collection and/or an increased number of writes to media 110, thus increasing write amplification and reducing SSD life. The improved TRIM operation is able to perform fast trimming of LBAs while also maintaining BUS accuracy by updating the BUS count in the background after acknowledging the TRIM operation to the host device.

In described embodiments, the TRIM operation updates the MLM structure to mark all trimmed LBAs as invalid. Further, the TRIM operation subtracts flash space previously used by trimmed LBAs from the BUS count of corresponding regions of media 110 to provide accurate garbage collection. Thus, to trim a particular LBA properly, two things are done: the particular LBA is invalidated in MLM structures, and the BUS count is updated reflecting that the particular LBA no longer consumes flash space. However, for a large trim region (e.g., the entire SSD) or a plurality of large trim regions, the time required to perform the invalidations and the BUS updates can become large and negatively impact system performance.

As described herein, the SLM page information stored in the FLM might include an indication (e.g., To-Be-Processed (TBP) indicator 714) indicating when LBAs within corresponding SLM pages are already invalidated (e.g., appear trimmed to host 180), but the BUS update portion of the TRIM operation is not yet complete. In contrast with marking a higher-level map entry invalid, setting the TBP indicator of the higher-level map entry does not imply that a physical address of the lower-level map page stored in the higher-level map entry is invalid: the physical address is required, and the lower-level map page itself cannot be de-allocated, until the lower-level map page is processed for BUS updates. However, all user data associated with the higher-level map entry is invalid with respect to host read operations, the same as if the higher-level map entry was marked invalid.

The size of the data of the associated LBAs stored in media 110 (e.g., 706) is used to update the BUS value for the corresponding regions when SSD 101 performs a TRIM operation. For example, the size values are subtracted from the BUS count of corresponding regions. In embodiments employing a MLM structure, updating the BUS count can be time consuming since updating the BUS count requires processing leaf-level map entries one by one. To improve processing time, described embodiments employ a Mega-TRIM operation that updates BUS counts of corresponding regions of media 110 in a background operation mode of SSD 101.

For example, when SSD 101 receives a TRIM command from host 180, media controller 120 performs a Mega-TRIM operation that sets the respective TBP indicator (e.g., 714) of FLM entries (e.g., 701) corresponding to SLM page(s) associated with the TRIM command. If the TRIM operation affects only a portion of the SLM entries in the SLM page, some embodiments might process the individual entries of the partial SLM page by updating each partial SLM page by marking the trimmed SLM entries invalid and updating the BUS count to reflect the trimmed portion of the SLM page. Other embodiments might defer updating the partial SLM pages by employing the TBP indicator (e.g., 714), a TRIM operation in progress indicator (e.g., 710) and TRIM LBA range (e.g., 712), allowing deferral of marking the trimmed SLM entries invalid and updating the BUS count. Then, a subsequent partial TRIM operation of a partially-trimmed SLM page optionally and/or selectively performs some or all of the update operations to the partially-trimmed SLM page immediately to avoid needing to track multiple sub-ranges in a given TRIM LBA range (e.g., 712). However, alternative embodiments might track multiple sub-ranges in TRIM LBA range (e.g., 712), allowing longer deferral of marking the trimmed SLM entries invalid and updating the BUS count.

When a Mega-TRIM operation is performed, after invalidating the associated LBAs, SSD 101 might acknowledge the TRIM command to host 180 before the BUS count is updated. Updating the BUS count is then performed in a background process of SSD 101 (typically completing within a range of several seconds to several minutes depending on TRIM range and the amount of activity initiated by host 180). Each time one of the SLM pages having the TBP indicator set in the associated FLM entry is completely processed (e.g., marking the trimmed SLM entries invalid and updating the BUS count for all SLM entries in the trimmed SLM page), the TBP indicator in the associated FLM entry is cleared. If all of the SLM entries of one of the SLM pages are trimmed, the associated FLM entry is marked as trimmed, obviating a need to process the SLM page further until a new write validates at least one entry within the SLM page.

Figure 8:
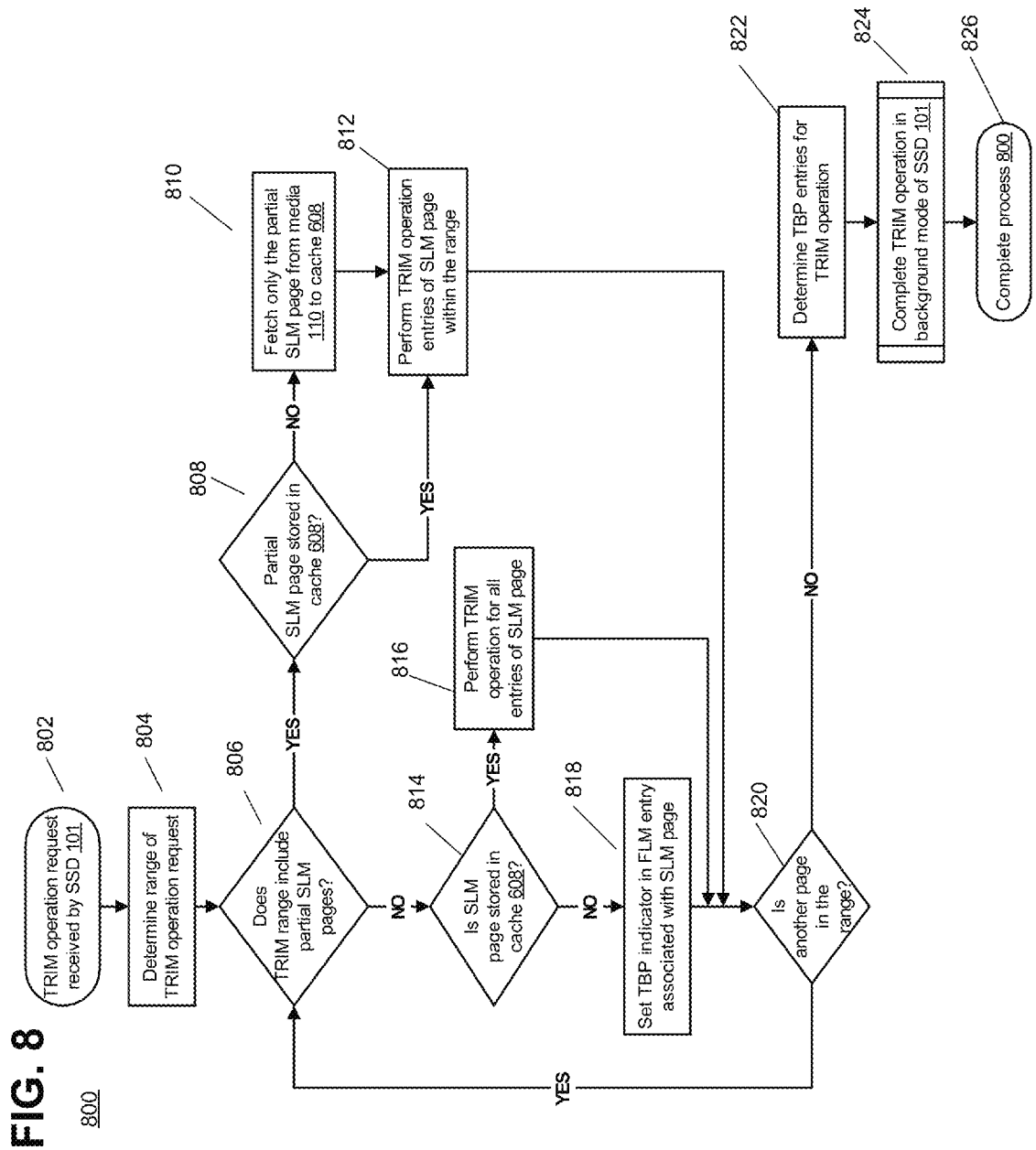
FIG. 8 shows an exemplary flow diagram of a Mega-TRIM operation employed by the flash memory storage system of FIG. 1

FIG. 8 shows a flow diagram of Mega-TRIM operation 800. As shown in FIG. 8, at step 802 a TRIM operation request is received by SSD 101 from host 180. At step 804, SSD 101 determines a range of the TRIM operation (e.g., one or more starting LBAs and ending LBAs). SSD 101 might maintain a beginning TBP index (min_flm_index_tbt) and an ending TBP index (max_flm_index_tbt) of the FLM indicating portions of the FLM for which the TBP indicator is set, indicating the portion of the FLM requiring background operations to update the BUS count and make memory blocks of media 110 re-available to host 180. In the background (e.g., during otherwise idle time of SSD 101), SSD 101 might examine the FLM entry at the beginning TBP index and if TBP is set on that FLM entry, read the associated SLM page and trim that whole SLM page by updating the BUS count according to each entry in the associated SLM page, clearing the TBP indicator in the FLM entry, and marking the FLM entry as trimmed, indicating the entire SLM page is trimmed The beginning TBP index (min_flm_index_tbt) is updated to indicate that the entry has been processed.

As shown in FIG. 8, when a TRIM command having a trim range (e.g., one of the 64-per-sector NCQ trim ranges for SATA) is processed, at step 806 SSD 101 determines whether at least one of the first SLM page of the TRIM range and the last SLM page of the TRIM range is a partial SLM page (e.g., the TRIM range only applies to part of the SLM page). If, at step 806, there are partial SLM pages at the start or end of the range, then at step 808, SSD 101 determines whether the partial SLM page is stored in cache 608. If, at step 808, the partial SLM page at the start or end of the TRIM range is stored in cache 608, then process 800 proceeds to step 812. If, at step 808, the partial SLM page at the start or end of the TRIM range is not stored in cache 608, then at step 810 SSD 101 fetches the partial SLM page from media 110 into cache 608 and process 800 proceeds to step 812. At step 812, the TRIM operation is performed for the entries of the partial SLM page that are within the range of the TRIM operation. For example, the SLM page entries in the TRIM range are updated corresponding to any LBAs in the TRIM range in the partial SLM page. Updating an entry in the SLM page includes setting the data invalid indicator and updating the BUS count. Process 800 proceeds to step 820.

If, at step 806, the SLM page is not a partial SLM page, at step 814, SSD 101 determines whether the full SLM page is stored in cache 608. If, at step 814, the full SLM page is stored in cache 608, then process 800 proceeds to step 816. If, at step 814, the full SLM page is not stored in cache 608, then at step 818 SSD 101 sets the TBP indicator in the FLM corresponding to the SLM page (e.g., 714). Process 800 proceeds to step 820.

When an SLM page needs to be fetched from media 101, if TBP is set in the associated FLM entry, then the SLM page is fully invalidated (all entries within the SLM page are treated as invalid with respect to host accesses), but the SLM page has not yet been processed for BUS update purposes. For a read, the SLM page is not needed (all data referenced by that SLM page is trimmed), and fetching the SLM page is not required. For a write, the SLM page is fetched, the BUS count is updated for all LBAs in the SLM page, all entries in the SLM page are invalidated, and then the SLM entries are updated within the SLM page that are being written. At step 816, a subset of the operations for a write are performed: the BUS count is updated for all LBAs in the SLM page, and all entries in the SLM page are invalidated.

At step 822, SSD 101 determines a range of entries of the FLM having the TBP indicator set (e.g., min_flm_index_tbt and max_flm_index_tbt), indicating the portion of the FLM requiring background operations to update the BUS count and make memory blocks of media 110 re-available to host 180. At step 824, the remainder of the TRIM operation (e.g., updating the BUS count and releasing the memory blocks as usable by host 180) occurs in the background (e.g., during otherwise idle time of SSD 101). SSD 101 might maintain one or more pointers that are updated as memory blocks are trimmed at step 816 (e.g., as their BUS count is updated) to ensure the new TRIM range is remembered as blocks are processed. For example, SSD 101 might examine the FLM entry at the beginning TBP index and if TBP is set on that FLM entry, read the associated SLM page and trim that whole SLM page by updating the BUS count, clearing the TBP indicator in the FLM entry, and marking the FLM entry as trimmed, indicating the entire SLM page is trimmed The beginning TBP index (min_flm_index_tbt) is updated to indicate that the entry has been processed. When the background TRIM operation at step 824 is complete, the TRIM operation is acknowledged to host 180. At step 826, process 800 completes.

In embodiments employing a two-level map structure or an MLM structure, one or more lower-level map pages (e.g., SLM pages 616 or leaf-level map pages of an MLM), are stored in a cache of map 144 (shown in FIG. 6 as SLM cache 608). For example, in a two-level map such as shown in FIG. 6, FLM index 606 is used to uniquely identify one of SLM pages 616. According to various embodiments, one or more caching techniques are used to look-up the FLM index and determine if the corresponding SLM page is in the cache (a hit) or is not (a miss). A fully associative cache, such as using a Content-Addressable Memory (CAM) for the look-up, might be used in some implementations. For example, the CAM might operate substantially as described in related to U.S. patent application Ser. No. 13/600,464 filed Aug. 31, 2012. In other embodiments, other cache structures, such as a multi-way set-associative cache, can be employed such that each entry has an associated index or address used to track information associated with the SLM page currently in the cache at that index or address.

SLM pages are said to "hit" or "miss" in SLM cache 608 according to whether the FLM index corresponding to the SLM page hits or misses in the CAM. SLM entries that hit in SLM cache 608 return a corresponding cache index, such as the entry in SLM cache 608 in which a matching FLM index was found. The returned FLM index identifies a corresponding data structure associated with the SLM page currently in the cache at that index. SLM entries that miss in SLM cache 608 might then fetch the corresponding SLM page from media 110 to be stored to SLM cache 608.

SLM pages are added to and/or removed from the cache, such as more recently accessed SLM pages replacing less recently accessed SLM pages, as part of a cache management algorithm. SLM pages stored in SLM cache 608 are in a clean state ("clean") or a dirty state ("dirty"). A dirty SLM page is an SLM page that is modified (and, thus, more current) in SLM cache 608 than as stored on media 110 and, thus, out-of-date on media 110. A clean SLM page is one where the same version is stored in both SLM cache 608 and on media 110 and, thus, is up-to-date on media 110. As additional or new SLM pages are written into SLM cache 608, SLM cache 608 replaces empty entries or clean SLM pages rather than flushing (e.g., writing back to media 110) and replacing dirty SLM pages in order to reduce a number of writes to media 110.

Figure 9:
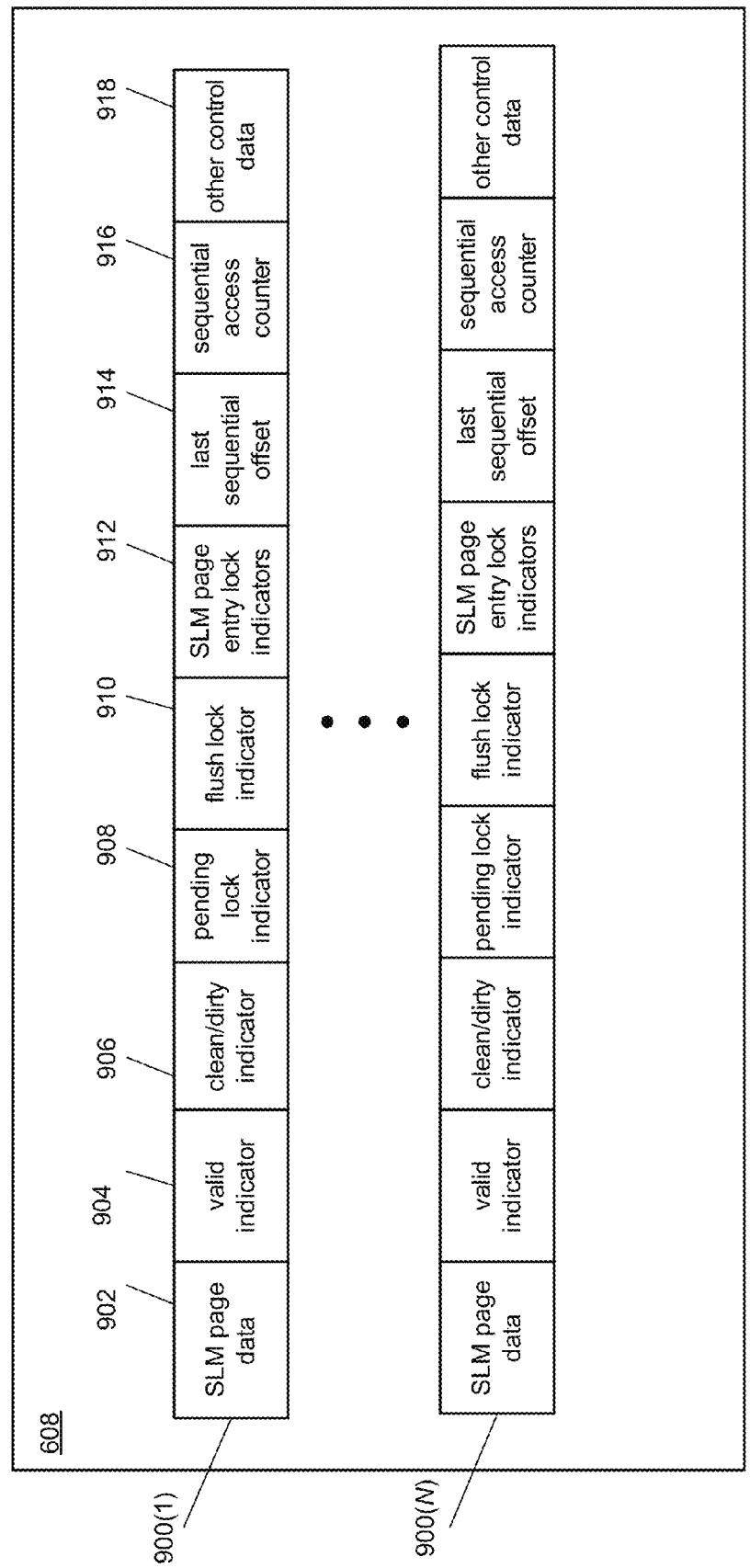
FIG. 9 shows an exemplary block diagram of a lower-level map page cache data structure employed by the flash memory storage system of FIG. 1.

In some embodiments, a data structure comprising a plurality of entries is associated with SLM cache 608, with a respective entry of the data structure for each index of SLM cache 608. Each of the SLM pages currently stored in SLM cache 608 has a respective data structure entry, such as data structures 900(1)-900(N) shown in FIG. 9. Each entry of the data structure might generally include the data of the cached SLM page (shown as 902), valid indicator 904, clean/dirty indicator 906, pending lock indicator 908, flush lock indicator 910, per-entry lock indicators for each entry of the corresponding SLM page shown as 912, last sequential access offset 914, sequential access counter 916, and other control data shown generally as 918. As described below, lock indicators 908, 910 and 912 are used to, at least in part, implement a set of ordering rules applied to requests accessing SLM cache 608. In some embodiments, SLM page entry lock indicators 912 might include 1 lock indicator per each SLM page entry. In other embodiments, SLM page entry lock indicators 912 might be a pool of indicators equal to or smaller in number than the number of map entries per SLM page. In a first example, there could be a fixed-size pool that is shared as needed. In a second example, the granularity of the lock bits could be equal to or less than one per map entry, such as one lock bit for every n map entries (where n is greater than or equal to 1).

Figure 10:
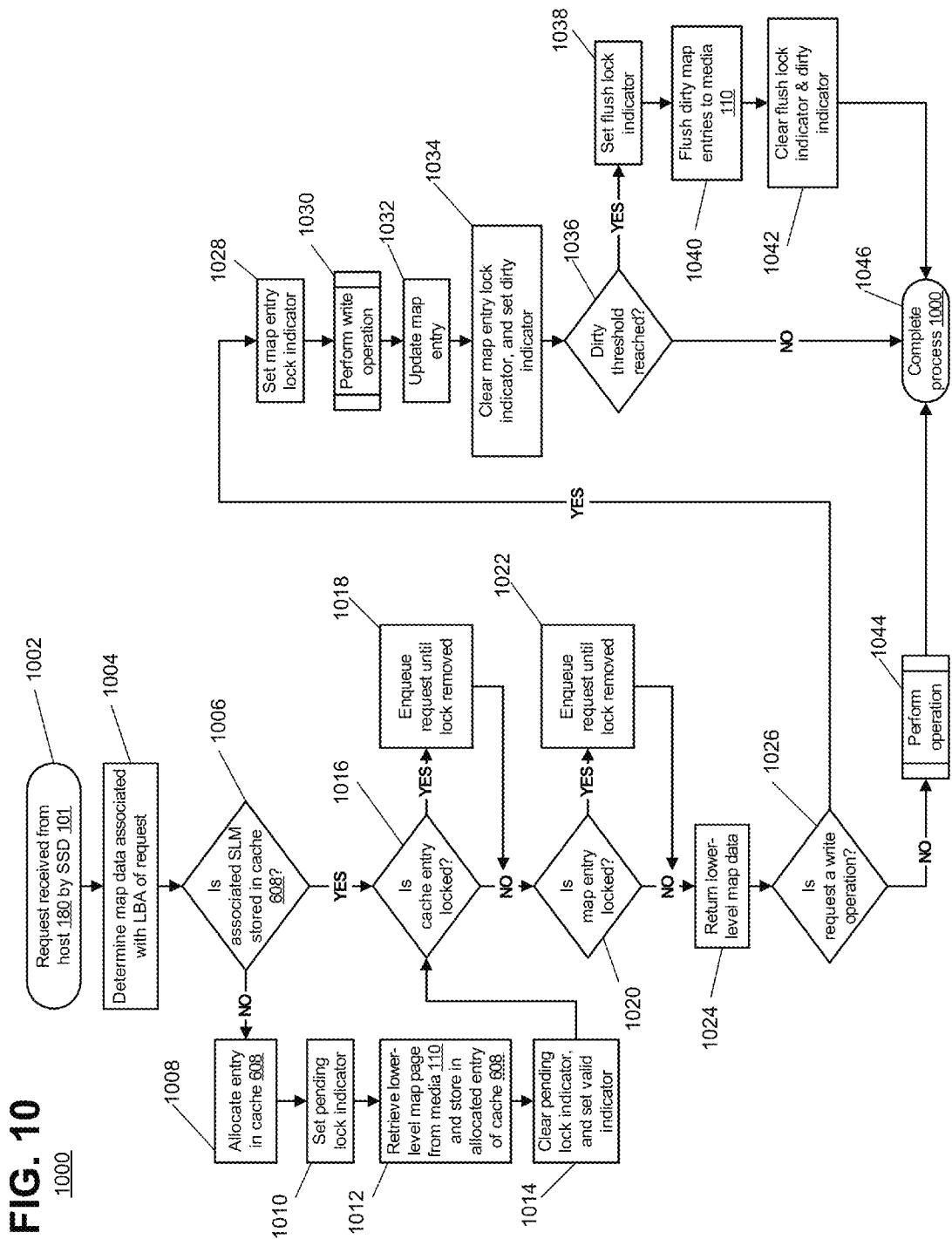
FIG. 10 shows an exemplary flow diagram of a host request processing operation employed by the flash memory storage system of FIG. 1.

FIG. 10 shows a flow diagram illustrating host request processing algorithm 1000. At step 1002, a request from host 180 is received by SSD 101 (e.g., by I/O interface 160). In some embodiments, process 1000 might generally be performed serially for each request received by SSD 101 from host 180. In other embodiments, process 1000 might generally be performed in parallel for two or more requests received by SSD 101 from host 180. In yet other embodiments, a request received by SSD 101 from host 180 is optionally and/or selectively split into one or more sub-requests of no more than a specified length, and process 1000 is performed serially and/or substantially in parallel on each of the sub-requests. Additionally, SSD 101 (e.g., by I/O interface 160) might include one or more queues to enqueue requests from host 180 that would violate ordering rules for access to media 110 or the various map structures of map 144. Requests are optionally and/or selectively enqueued on a determined one of the queues in arrival order, and are removed from the determined queue in a same order as the requests were enqueued (e.g., first-in, first-out). Service order among the queues might be based, at least in part, on events such as fetching a leaf-level map page into the cache. As will be described, ordering rules might be enforced by lock indicators of the various map structures of map 144.

Requests from host 180 include an address, a length, and a request type. The request type indicates whether the request is a read request (e.g., to read data of the given length starting from the given address), a write request (e.g., to write data of the given length starting at the given address), and optionally other types of commands, such as management requests (e.g., a TRIM operation, etc.). The address specifies a starting LBA of the request. As described herein, the LBA is translated by map 144 into a physical address of media 110. Thus, the LBA is associated with a respective one or more of a plurality of leaf-level pages of a multi-level map (e.g., SLMs 616 of FIG. 6), with lower-level map pages including a plurality of map entries, one or more of which are associated with the LBA, based on the given length of the request. At step 1004, SSD 101 (e.g., map 144) determines the map page associated with the LBAs of the received request (e.g., based on the address and the length of the request). As described, a MLM structure might be employed where an associated entry in FLM 610 points to an entry in one of SLMs 616, where the entry in SLM 616 determines the physical address in media 110 associated with the LBA. The SLMs are stored on media 110, although a subset of the SLMs might be cached in SLM cache 608, for example, a number of most recently used SLMs (e.g., a number of the most recently accessed leaf-level map pages) or a number of most frequently accessed SLMs (e.g., a number of the most commonly accessed leaf-level map pages over a given time period). Depending on the length of the request, parts of process 1000 might be repeated if the length of the request spans map pages and/or map page entries (e.g., generally steps 1006-1046), while other parts of process 1000 are performed once for the request independent of the request length (e.g., shown generally as steps 1002-1004, 1030 and 1044).

At step 1006, map 144 determines whether the associated SLMs are stored in SLM cache 608 (e.g., a cache hit). For example, the look-up determines if an index in a higher-level map and associated with the respective leaf-level page is present in a look-up table, such as a CAM, of SLM cache 608. If, at step 1006, there is a cache hit, then at step 1016, SLM cache 608 determines (e.g., based on pending lock indicator 908 and flush lock indicator 910) whether the entry of SLM cache 608 storing the lower-level map page is locked. If, at step 1016, the cache entry is locked, then at step 1018, the received request is queued until the cache entry is unlocked and available for processing. If, at step 1016, the cache entry is not locked, then at step 1020, map 144 determines if the corresponding entries of the lower-level map are locked (e.g., based on SLM page entry lock indicators 912). If, at step 1020, the entries of the lower-level map are locked, then at step 1022, the received request is queued until the entries of the lower-level map are unlocked and available for processing. If the respective lower-level map page is present (e.g., step 1006) and is not locked (e.g., steps 1016 and 1020), then, at step 1024, SLM cache 608 provides the map data of the corresponding lower-level map (e.g., the physical address(es) corresponding to the LBA(s) of the request received at step 1002). In described embodiments, if the respective lower-level map page is present in SLM cache 608 but is locked (e.g., steps 1016 and 1020), the request is enqueued, such as on a particular queue associated with either the respective lower-level map page or the respective cache entry, awaiting the clearing of the lock (e.g., steps 1018 and 1022).

If, at step 1006, the respective lower-level map page is not present in SLM cache 608 (e.g., a cache miss), then at step 1008, a location in the cache is allocated to store the respective lower-level map page. At step 1010, the pending lock indicator (e.g., 908) of the cache entry is set and at step 1012, the lower-level map page is read from media 110 and stored in the allocated cache entry. Although not shown in FIG. 10, in some embodiments, while the lower-level map page is read from media 110, the request might be enqueued, such as on a queue associated with either the respective lower-level map page or the respective cache entry until the leaf-level map page is stored in cache 608. On completion of storing of the lower-level map page into SLM cache 608, at step 1014 the pending lock indicator is cleared, the valid indicator (e.g., valid indicator 904) is set to indicate that cache entry contains a valid leaf-level map page, and the arriving request is dequeued and is allowed to proceed to step 1016.

After SLM cache 608 provides the map data of the corresponding lower-level map (e.g., the physical address(es) corresponding to the LBA(s) of the request received at step 1002) at step 1024, at step 1026, if the request received at step 1002 is a request to write to media 110, process 1000 continues to step 1028. If, at step 1026, the request received at step 1002 is not a request to write to media 110 (e.g., it is a request to read from media 110 or a management command), process 1000 continues to step 1044. At step 1044, the operation of the request is performed based on the lower-level map data returned at step 1024 (e.g., the physical address(es) corresponding to the LBA(s) of the request received at step 1002). For example, data located at the LBA(s) of the request received at step 1002 is read from media 110 and sent to host 180. Once the operation of the request is complete at step 1044, process 1000 completes at step 1046.

If, at step 1026, the request received at step 1002 is a request to write to media 110, at step 1028, the map entry lock indicator for the lower-level map page entries associated with the request (e.g., SLM page entry lock indicators 912) are set to indicate that data stored in the associated map entries might change corresponding to the write operation that is in-process. In some embodiments, one or more of steps 1006, 1016, 1020, 1024, 1026, and 1028 are performed by a look-up engine. For example, as described in U.S. patent application Ser. No. 13/600,464 filed Aug. 31, 2012 and incorporated by reference herein, an upper-level map index (e.g., a first-level map index of a two-level map) and a leaf-level map page entry number (e.g., a second-level map page entry number of a two-level map) are input to the look-up engine, and the look-up engine is enabled to one or more of: return the upper-level map entry if the leaf-level map page associated with the upper-level map index is not found in the cache; return the leaf-level map entry associated with the upper-level map index and the leaf-level map page entry number if the leaf-level map page associated with the upper-level map index is found in the cache; update and/or return one or more status bits, such as lock bits, valid bits, and/or dirty bits, of the leaf-level map page and/or the leaf-level map entry; allocate an entry in the cache; lock an entry in the cache; and other activities related to look-up in and/or management of the cache.

At step 1030, the write operation is performed based on the lower-level map data returned at step 1024 (e.g., the physical address(es) corresponding to the LBA(s) of the request received at step 1002). For example, data sent from host 180 is written to the LBA(s) of media 110. At step 1032, the map entries associated with the LBAs of the write operation are updated (e.g., in one or more SLM pages) by map 144. For example, the map page data entries such as shown in FIG. 7 are updated for the associated SLM pages. At step 1034, the map entry lock indicator for the lower-level map page entries associated with the request (e.g., SLM page entry lock indicators 912) are cleared to indicate that the associated map entries are up-to-date, and the dirty indicator (e.g., clean/dirty indicator 906) for the associated SLM pages is set to indicate that the associated SLM pages stored in SLM cache 608 have been updated versus the copy of the same SLM pages stored on media 110. Process 1000 then proceeds to step 1036.

In order to allocate an entry to store the respective lower-level map page in SLM cache 608, it might be necessary to replace a lower-level map page already stored in the cache with a new map page. Thus, in some embodiments, updated ("dirty") map pages might periodically be written back to media 110 (as shown by steps 1036-1042), for example when a given threshold number of lower-level map pages are dirty, or after an elapsed period of time. Thus, by keeping at least a minimum number of lower-level map pages stored in cache 608 "clean" (e.g., stored to media 110 in its current state), any lower-level map page that is not dirty could be selected to be over-written to store a new lower-level map page (e.g., at step 1008). In some embodiments, map 144 might select a least recently used one of the clean entries to be replaced by a new SLM map page.

For example, at step 1036, map 144 determines whether a number of dirty entries in SLM cache 608 has reached a threshold number (e.g., to maintain a minimum number of clean entries). If, at step 1036 the dirty threshold has not been reached, then process 1000 completes at step 1046. If, at step 1036 the dirty threshold has been reached, then at step 1038 the flush lock indicator (e.g., 910) of one or more of the dirty lower-level map pages is set to indicate that the respective map page is in the process of being flushed to media 110. At step 1040, the one or more dirty lower-level map pages are "flushed", or written back, to media 110. Dirty lower-level map pages are flushed from cache 608 to media 110 to preserve any changes in the dirty lower-level map page. At step 1042, the flush lock indicator of the one or more map pages is cleared to indicate that the flush is complete, and the formerly dirty cache entry is now clean (e.g., the version stored on media 110 is up-to-date with the version stored in cache 608). Process 1000 then completes at step 1046.

Figure 11:
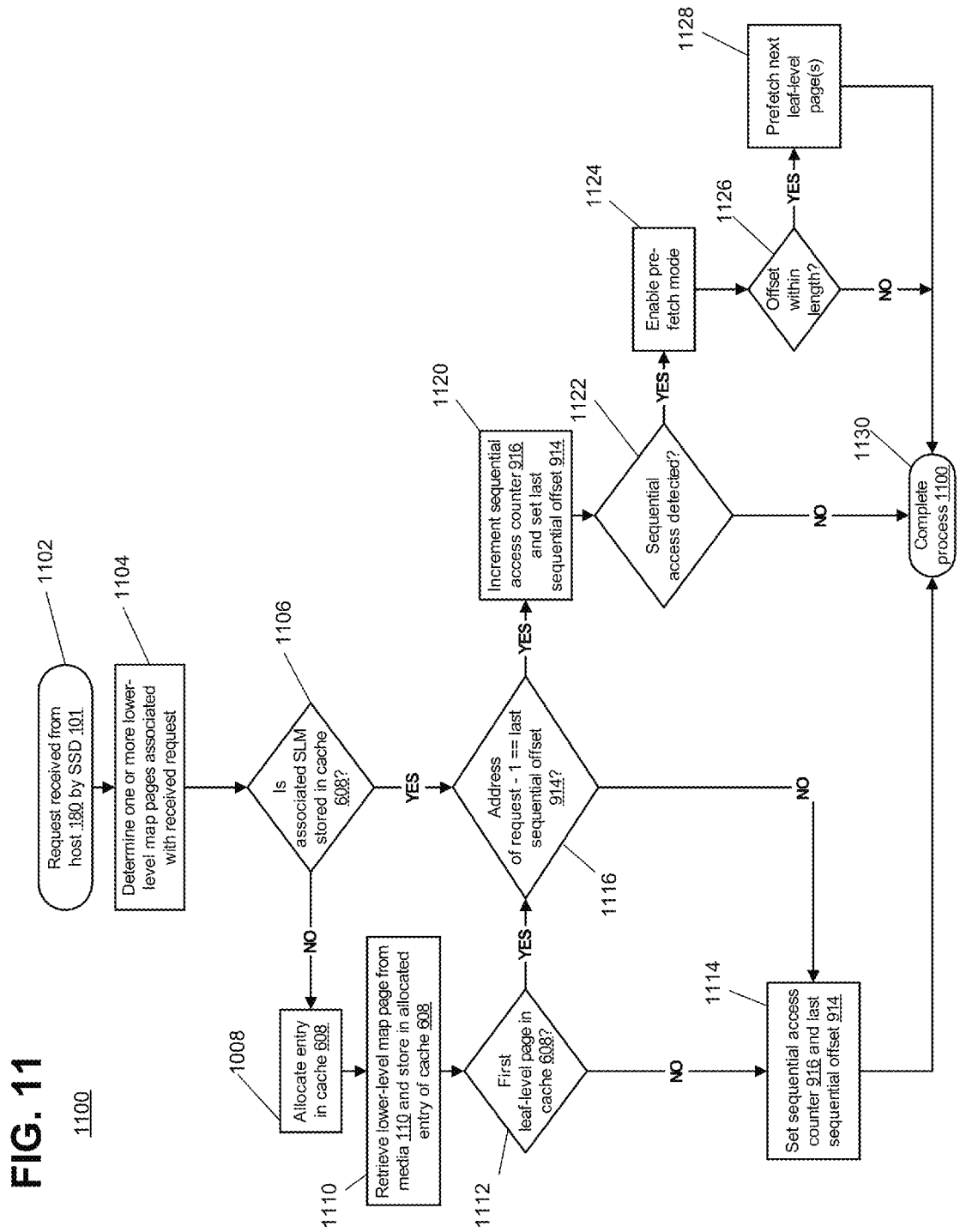
FIG. 11 shows an exemplary flow diagram of a host request processing operation employed by the flash memory storage system of FIG. 1.

FIG. 11 illustrates an example of the application of the lock bits and the effect on ordering. In some embodiments, process 1100 of FIG. 11 enables tracking a number of separate sequential access streams, such as one stream for each of the leaf-level pages stored in SLM cache 608. Process 1100 might generally be performed once for each received request, or each sub-request of the request as described with reference to FIG. 10. At step 1102, one of a series of requests from host 180 is received by SSD 101 (e.g., by I/O interface 160). Requests from host 180 include an address, a length, and a request type. As described herein, the address specifies a starting LBA of the request that, in conjunction with the length, is used by map 144 to determine associated lower-level map pages and, thus, a physical address of media 110 for the request. At step 1104, map 144 determines one or more leaf-level map pages associated with the received request, For example, the received request is associated with a respective entry in a first (generally lowest-addressed) leaf-level map page corresponding to the starting address of the request, and, based on the length of the request, is also associated with a respective entry in a second (generally highest-addressed) leaf-level map page corresponding to the ending address of the request. In other words, the respective address and respective length correspond to a range of the map entries in one or more leaf-level map pages. Depending on the address and the length, the first leaf-level map page and the second leaf-level page might be the same map page. Further, if the respective length of the request is less than or equal to the granularity size of the map entry, the first map entry and the second map entry might be the same entry.

At step 1106, an arriving one of the requests is looked up in SLM cache 608 to determine if the one or more leaf-level pages are stored in the cache (e.g., hit or miss). If, at step 1106, one or more of the respective leaf-level map pages of the request are not present in cache 608, then at step 1108 locations are allocated in the cache for each leaf-level map page that is not already present in cache 608. At step 1110, the missing leaf-level map pages are fetched from media 110 and, at step 1112 a test is made to determine if the first leaf-level page was already present in cache 608 and, thus, did not have to be fetched from media 110. If, at step 1112, the first leaf-level map page was not already present in cache 608 and had to be fetched from media 110, then the arriving request cannot continue, and at step 1114 the sequential access counter (e.g., 916) of the last leaf-level map page is set to 1 indicating that there has been only one sequential access of map pages. Further, the respective sequential access offset (e.g., 914) of the last leaf-level map page is set to the offset of the last map entry (e.g., in the last leaf-level map page). If, at step 1112, the first leaf-level map page (or all of the respective leaf-level map pages of the request) are present in cache 608, then at step 1116 a test is made to see if the offset of the first map entry is immediately after the respective sequential access offset of the first leaf-level map page (e.g., whether the address of the request is the next address after the address stored in 914). That is, this test determines if the arriving request starts where a previous one of the requests accessing the first leaf-level page ended. If the arriving request does not start where a previous one of the requests accessing the first leaf-level page ended (1116 NO), then similar processing as if the first leaf-level page was not already present and had to be fetched occurs at step 1114 where the sequential access counter (e.g., 916) of the last leaf-level map page is set to 1 indicating that there has been only one sequential access of map pages.

If, at step 1116, the arriving request does start where a previous one of the requests accessing the first leaf-level map page ended, then at step 1120, the respective sequential access counter (e.g., 916) of the last leaf-level map page is set to 1 more than the respective sequential access counter of the first leaf-level map page, and the respective sequential access offset (e.g., 914) of the last leaf-level page is set to the offset of the last map entry. Incrementing the sequential access counters in this manner enables sequential detection to operate across leaf-level map page boundaries. In various embodiments, the sequential access counters saturate at a maximum value. In further embodiments, if the first leaf-level page is not a same one of the leaf-level map pages as the last leaf-level map page, then the respective sequential access counter (e.g., 916) of all of the respective leaf-level map pages of the arriving request except the last leaf-level map page are cleared. Then, at step 1122, a test is performed to determine if a sequential access has been detected. If, at step 1122, a sequential access is detected, then, at step 1124, a prefetch mode is enabled for the arriving request. According to various embodiments, the test is based on one or more of: the length of the request being equal to or larger than a specified length value; the sequential access counter being equal to or larger than a specified sequential access count value; the offset in the last leaf-level map page; the number of entries in each leaf-level map page; and other factors.

Enabling the prefetch mode one or more of: optimizes fetching of data and/or map pages from media 110; preserves data and/or map pages fetched from media 110 that would otherwise be discarded; prefetches data and/or map pages from media 110; and other performance optimizations. In various embodiments, if the respective sequential access offset of the last leaf-level page (after being set to the offset of the last map entry) is "too close" to a final map entry in the last leaf-level page, such as by being within the respective length of the arriving request of the final map entry at step 1126, then, at step 1128, one or more sequential leaf-level pages are prefetched from media 110. In a multi-level map, fetching leaf-level pages requires referencing higher-level pages of the map, which possibly also need to be fetched from media 110. In some embodiments, a number of the leaf-level pages that are fetched is based on the length of the request and/or the sequential access counter. At step 1130, process 1100 completes.

In some embodiments, sequential access also tracks a sequential request type, such as having additional state in the entries of the data structure comprising a type of last access field. In addition to the sequential access offset having to match to determine an access is sequential, the type of last access field must match as well. In various embodiments, additional state in the entries of the data structure enables tracking a plurality of sequential access streams in each of the leaf-level pages stored in cache 608. For example, it is desirable in some usage scenarios of SSD 101 to separately track sequential read streams and sequential write streams.

Thus, as described herein, described embodiments provide a media controller that processes requests from a host device that include a logical address and address range. A map of the media controller determines physical addresses of a solid-state media associated with the logical address and address range of the request. The map is a multi-level map having a plurality of leaf-level map pages that are stored in the solid-state media, with a subset of the leaf-level map pages stored in a map cache. Each leaf-level map page includes map entries that are each associated with physical addresses of the solid-state media. Based on the logical address and address range, it is determined whether a corresponding leaf-level map page is stored in the map cache. If the leaf-level map page is stored in the map cache, a cache index and control indicators of the map cache entry are returned in order to enforce ordering rules that selectively enable access to a corresponding leaf-level map page based on the control indicators and a determined request type.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of the described embodiments might be made by those skilled in the art without departing from the scope expressed in the following claims.

We claim:

1. A media controller for a solid-state media, the media controller in communication with a host device, the media controller comprising:
   a control processor configured to, in response to receiving a request from the host device, the request including at least one logical address and address range:

determine, by a map of the media controller coupled to the control processor, one or more physical addresses of the solid-state media associated with the at least one logical address and address range, the map comprising a multi-level map having a plurality of leaf-level map pages, the plurality of leaf-level map pages stored in the solid-state media, and a subset of the plurality of leaf-level map pages stored in a map cache coupled to the control processor, each leaf-level map page comprising a plurality of map entries, each entry associated with one or more physical addresses of the solid-state media;

determine a type of the received request;

determine, based on the at least one logical address and address range, whether a corresponding leaf-level map page is stored in the map cache;

if the corresponding leaf-level map page is stored in the map cache, the map cache is configured to return a cache index and one or more control indicators of the map cache entry storing the corresponding leaf-level map page; and enforce a set of ordering rules that selectively enable access to a corresponding leaf-level map page based on the one or more control indicators and the determined request type.

2. The media controller of claim 1, wherein if the corresponding leaf-level map page is not stored in the map cache, the control processor is further configured to:

allocate, if available, an empty entry of the map cache;

retrieve the currently accessed leaf-level map page from the solid-state media; and store the retrieved leaf-level map page to the allocated entry of the map cache.

3. The media controller of claim 1, wherein the one or more control indicators comprise a leaf-level map page lock indicator and a plurality of leaf-level map entry lock indicators.

4. The media controller of claim 3, wherein the control processor is configured to set the leaf-level map page lock indicator of a corresponding leaf-level map page when the corresponding leaf-level map page is being retrieved from the solid-state media to the map cache.

5. The media controller of claim 4, wherein:

the type of the received request comprises a write request and a read request;

if the determined type of the received request is a write request, the control processor is further configured to:
set one or more of the plurality of leaf-level map entry lock indicators corresponding to the at least one logical address and address range accessed by the write request.

6. The media controller of claim 5, wherein:

independent of the type of the received request, if at least one of the plurality of leaf-level map entry lock indicators is set, the control processor is configured to queue the received request on an associated queue.

7. The media controller of claim 6, wherein the assigned queue is one of a plurality of queues assigned dynamically according to detecting that the leaf-level map page lock indicator or one of the plurality of leaf-level map entry lock indicators is set.

8. The media controller of claim 5, wherein, upon completion of the write request, the control processor is configured to clear the one or more of the plurality of leaf-level map entry lock indicators corresponding to the physical addresses accessed by the write request.

9. The media controller of claim 5, wherein each of the leaf-level map entries are configured to have the lock indicators set independently.

10. The media controller of claim 3, wherein the control processor is configured to clear the leaf-level map page lock indicator of a corresponding leaf-level map page when the corresponding leaf-level map page is stored in the solid-state media to the map cache.

11. The media controller of claim 1, wherein the control processor is configured to, based on the control indicators of the leaf-level map page, queue the received request.

12. The media controller of claim 1, wherein the map is a multi-level map, the multi-level map comprising:

a second-level map having a plurality of second-level map pages, each of the second-level map pages having a plurality of entries, each entry configured to store a physical address of the solid state media; and a first-level map having a plurality of entries, each entry associated with a second-level map page, the first-level map configured to associate the at least one logical address and address range to at least one of the second-level map pages.

13. The media controller of claim 12, wherein the first-level map is stored in a map memory of the media controller, all of the second-level map pages are stored in the solid state media, and at least a subset of the second-level map pages are temporarily stored in a map cache coupled to the control processor of the media controller.

14. The media controller of claim 1, wherein the control processor is further configured to:

maintain a sequential access tracking structure for each of the leaf-level map pages stored in the map cache, the sequential access tracking structure maintaining a count of accesses to each leaf-level map page;

update the sequential access tracking structure of a given leaf-level map page stored in the map cache when the at least one logical address and address range of the received request correspond to the given leaf-level map page;

wherein the control processor is configured to detect, based on the sequential access tracking structure, one or more interleaved streams of sequential accesses, each of the interleaved streams corresponding to a given one of the leaf-level map pages.

15. The media controller of claim 14, wherein the control processor is configured to increment the count of accesses associated with a given leaf-level map page stored in the map cache when a subsequent request accesses a logical address range contiguous with the logical address range of a previous received request.

16. The media controller of claim 15, wherein the control processor is further configured to:

if the count of accesses of the sequential access tracking structure reaches a threshold:

prefetch leaf-level map pages corresponding to one or more logical address ranges sequential to the logical address range of the subsequent request.

17. A method of processing, by media controller for a solid-state media, a request received from a host device, the request including at least one logical address and address range, the method comprising:

determining, by a map of the media controller coupled to a control processor of the media controller, one or more physical addresses of the solid-state media associated with the at least one logical address and address range, the map comprising a multi-level map having a plurality of leaf-level map pages, the plurality of leaf-level map pages stored in the solid-state media, and a subset of the plurality of leaf-level map pages stored in a map cache coupled to the control processor, each leaf-level map page comprising a plurality of map entries, each entry associated with one or more physical addresses of the solid-state media;

determining a type of the received request;

determining, based on the at least one logical address and address range, whether a corresponding leaf-level map page is stored in the map cache;

if the corresponding leaf-level map page is stored in the map cache, returning a cache index and one or more control indicators of the map cache entry storing the corresponding leaf-level map page; and enforcing a set of ordering rules that selectively enable access to a corresponding leaf-level map page based on the one or more control indicators and the determined request type.

18. The method of claim 17, wherein if the corresponding leaf-level map page is not stored in the map cache, the method further comprises:

allocating, if available, an empty entry of the map cache;

retrieving the currently accessed leaf-level map page from the solid-state media; and storing the retrieved leaf-level map page to the allocated entry of the map cache.

19. The method of claim 17, wherein the one or more control indicators comprise a leaf-level map page lock indicator and a plurality of leaf-level map entry lock indicators, the method further comprising:

setting, by the control processor, the leaf-level map page lock indicator of a corresponding leaf-level map page when the corresponding leaf-level map page is being retrieved from the solid-state media to the map cache.

20. The method of claim 19, wherein the type of the received request comprises a write request and a read request, the method further comprising:

if the determined type of the received request is a write request:

setting, by the control processor, one or more of the plurality of leaf-level map entry lock indicators corresponding to the at least one logical address and address range accessed by the write request.

21. The method of claim 20, wherein, if at least one of the plurality of leaf-level map entry lock indicators is set, the method further comprises:

queuing, by the control processor, independent of the type of the received request, the received request on an associated queue.

22. The method of claim 20, further comprising:

dynamically assigning, by the control processor, one of a plurality of queues based on whether the leaf-level map page lock indicator or one of the plurality of leaf-level map entry lock indicators is set.

23. The method of claim 20, wherein, upon completion of the write request, the method further comprises:

clearing, by the control processor, the one or more of the plurality of leaf-level map entry lock indicators corresponding to the physical addresses accessed by the write request.

24. The method of claim 20, comprising:

independently setting, by the control processor, the lock indicators for each of the leaf-level map entries.

25. The method of claim 19, further comprising:

clearing, by the control processor, the leaf-level map page lock indicator of a corresponding leaf-level map page when the corresponding leaf-level map page is stored in the solid-state media to the map cache.

26. The method of claim 17, wherein the map is a multi-level map, the multi-level map comprising:

a second-level map having a plurality of second-level map pages, each of the second-level map pages having a plurality of entries, each entry configured to store a physical address of the solid state media; and a first-level map having a plurality of entries, each entry associated with a second-level map page, the first-level map configured to associate the at least one logical address and address range to at least one of the second-level map pages.

27. The method of claim 26, further comprising:

storing the first-level map in a map memory of the media controller;

storing all of the second-level map pages in the solid state media; and temporarily storing at least a subset of the second-level map pages in a map cache coupled to the control processor of the media controller.

28. The method of claim 17, further comprising, by the control processor:

maintaining a sequential access tracking structure for each of the leaf-level map pages stored in the map cache, the sequential access tracking structure maintaining a count of accesses to each leaf-level map page;

updating the sequential access tracking structure of a given leaf-level map page stored in the map cache when the at least one logical address and address range of the received request correspond to the given leaf-level map page; and detecting, based on the sequential access tracking structure, one or more interleaved streams of sequential accesses, each of the interleaved streams corresponding to a given one of the leaf-level map pages.

29. The method of claim 28, further comprising, by the control processor:

incrementing the count of accesses associated with a given leaf-level map page stored in the map cache when a subsequent request accesses a logical address range contiguous with the logical address range of a previous received request.

30. The method of claim 29, further comprising, by the control processor:

if the count of accesses of the sequential access tracking structure reaches a threshold:

prefetching leaf-level map pages corresponding to one or more logical address ranges sequential to the logical address range of the subsequent request.

31. The method of claim 17, wherein the method is implemented by a machine executing program code encoded on a non-transitory machine-readable storage medium.

* * * * *